US009662583B2

(12) United States Patent
Kawaguchi et al.

(10) Patent No.: US 9,662,583 B2
(45) Date of Patent: May 30, 2017

(54) PORTABLE TYPE GAME DEVICE AND METHOD FOR CONTROLLING PORTABLE TYPE GAME DEVICE

(75) Inventors: Satoshi Kawaguchi, Kanagawa (JP); Akihiko Sugawara, Kanagawa (JP); Toshiyuki Hiroi, Saitama (JP); Koji Kageyama, Kanagawa (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 1000 days.

(21) Appl. No.: 13/001,862

(22) PCT Filed: Jun. 22, 2009

(86) PCT No.: PCT/JP2009/061324
§ 371 (c)(1),
(2), (4) Date: Mar. 7, 2011

(87) PCT Pub. No.: WO2010/001756
PCT Pub. Date: Jan. 7, 2010

(65) Prior Publication Data
US 2011/0159957 A1  Jun. 30, 2011

(30) Foreign Application Priority Data
Jun. 30, 2008  (JP) ................................ 2008-171767

(51) Int. Cl.
A63F 9/24        (2006.01)
A63F 13/655      (2014.01)
(Continued)

(52) U.S. Cl.
CPC ............ *A63F 13/655* (2014.09); *A63F 13/08* (2013.01); *A63F 13/10* (2013.01); *A63F 13/213* (2014.09);
(Continued)

(58) Field of Classification Search
CPC ........ A63F 13/10; G06F 3/0325; G06F 3/012; G02B 2006/12104
(Continued)

(56) References Cited

U.S. PATENT DOCUMENTS 4,681,415 A   7/1987  Beer et al.
6,020,891 A   2/2000  Rekimoto
(Continued)

FOREIGN PATENT DOCUMENTS

CN   1497945   5/2004
CN   1531304   9/2004
(Continued)

OTHER PUBLICATIONS

Jonathan Mooser et al: "Large Document, Small Screen: A Camera Driven Scroll and Zoom Control for Mobile Devices", Proceedings of the 2008 Symposium on Interactive 3D Graphics and Games, SI3D'08, Feb. 15, 2008 (Feb. 15, 2008), pp. 27-34, XP55000437, New York, New York, USA DOI: 10.1145/1342250.1342254 ISBN: 978-1-59-593983-8.
(Continued)

*Primary Examiner* — David L Lewis
*Assistant Examiner* — Ross Williams
(74) *Attorney, Agent, or Firm* — Haug Partners LLP; William S. Frommer; Xuezheng Wang

(57) ABSTRACT

Provided are a portable game device and a method of controlling the portable game device capable of making improved use of an image generated by image pickup unit. A pickup object image generating unit (52) picks up an image of a pickup object and generates a pickup object image. A pickup object distance measuring unit (54) measures a distance to the pickup object. An information processing execution unit (56) executes information processing
(Continued)

based on the pickup object image and the distance measured by the pickup object distance measuring unit (54).

2 Claims, 13 Drawing Sheets

(51) Int. Cl.
    *A63F 13/213*     (2014.01)
    *A63F 13/525*     (2014.01)
    *A63F 13/92*     (2014.01)
    *A63F 13/90*     (2014.01)
    *A63F 13/40*     (2014.01)
    *H04N 5/225*     (2006.01)

(52) U.S. Cl.
    CPC ............ *A63F 13/525* (2014.09); *A63F 13/92* (2014.09); *H04N 5/2259* (2013.01); *A63F 2300/1043* (2013.01); *A63F 2300/1087* (2013.01); *A63F 2300/204* (2013.01); *A63F 2300/6018* (2013.01); *A63F 2300/695* (2013.01)

(58) Field of Classification Search
    USPC ................................................ 463/30–33, 37
    See application file for complete search history.

(56) References Cited

U.S. PATENT DOCUMENTS

| | | | |
|---|---|---|---|
| 7,705,876 B2* | 4/2010 | Starkweather et al. | ........ 348/51 |
| 2002/0085112 A1* | 7/2002 | Hiramatsu | ........... H04N 5/2353 |
| | | | 348/362 |
| 2005/0059488 A1 | 3/2005 | Larsen et al. | |
| 2005/0068460 A1* | 3/2005 | Lin | ................................ 348/374 |
| 2005/0270368 A1 | 12/2005 | Hashimoto | |
| 2006/0223635 A1 | 10/2006 | Rosenberg | |
| 2008/0211771 A1* | 9/2008 | Richardson | .................... 345/158 |
| 2009/0002797 A1* | 1/2009 | Kwong | ................. H04N 5/2259 |
| | | | 359/225.1 |

FOREIGN PATENT DOCUMENTS

| | | |
|---|---|---|
| CN | 2 731 484 | 10/2005 |
| CN | 1798593 A | 7/2006 |
| EP | 0 837 418 | 4/1998 |
| GB | 2326732 | 12/1998 |
| GB | 2 430 042 | 3/2007 |
| JP | 10 51711 | 2/1998 |
| JP | 2002 84552 | 3/2002 |
| JP | 2002 351603 | 12/2002 |
| JP | 3558104 | 5/2004 |
| JP | 2006 67469 | 3/2006 |
| JP | 2006 201517 | 8/2006 |
| JP | 2008 502206 | 1/2008 |
| JP | 2008 33521 | 2/2008 |
| TW | 282435 | 6/2007 |
| WO | WO 99/35633 | 7/1999 |
| WO | WO 2005 122582 | 12/2005 |
| WO | WO 2006/097722 | 9/2006 |

OTHER PUBLICATIONS

Tolga Capin et al: "Camera-Based Virtual Environment Interaction on Mobile Devices", Jan. 1, 2006 (Jan. 1, 2006), Computer and Information Sciences—ISCIS 2006 Lecture Notes in Computer Science; LNCS, Springer, Berlin, DE, pp. 765-773, XP019047139, ISBN: 978-3-540-47242-1.
English Translation of the International Preliminary Report on Patentability (PCT/IB/338).
Kittler J et al: "3D Assisted Face Recognition: A Survey of 3D Imaging, Modelling and Recognition Approaches", Computer Vision and Pattern Recognition 2005, Jun. 20, 2005 (Jun. 20, 2005).
Search Report issued in corresponding European Application No. 09773334.9-2218 on Aug. 8, 2012.
Office Action issued in corresponding Japanese Patent Application No. 2010-518999 dated Sep. 18, 2012 and a partial English translation of the Office Action.
Office Action issued in corresponding Chinese Patent Application No. 200980125218.7 on Mar. 7, 2013 and the Office Action English translation.
Interview Summary issued in corresponding European application No. 12000038.5 dated Jan. 3, 2014.
Chinese Office Action dated Mar. 7, 2013.
Office Action issued in corresponding Chinese Application No. 200980125218.7 dated Aug. 1, 2014 and the English Translation.

* cited by examiner

FIG.4B
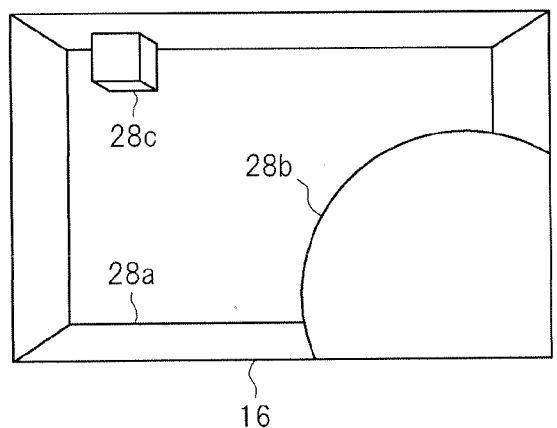
FIG.4C
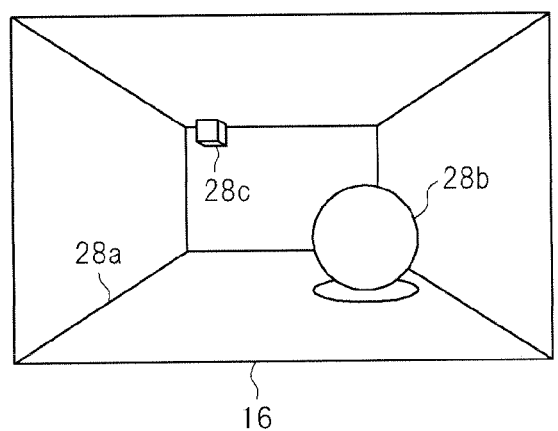
FIG.5A
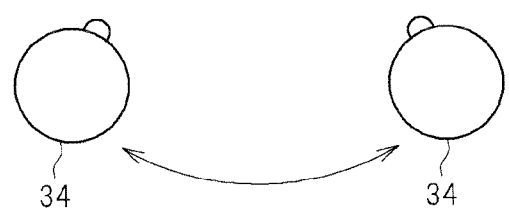

PORTABLE TYPE GAME DEVICE AND METHOD FOR CONTROLLING PORTABLE TYPE GAME DEVICE

TECHNICAL FIELD

The present invention relates to a portable game device and a method of controlling the portable game device.

BACKGROUND ART

A portable game device has become widespread, allowing players to enjoy playing games in various places. Some of the portable game devices are connectable to image pickup means such as a camera. The portable game device connectable to a camera is capable of storing images of people picked up by the camera and performing information processing by using the images thus picked up. Further, for example, there is known a technology, as disclosed in Patent Literature 1, which relates to a three-dimensional virtual object display device capable of displaying a three-dimensional virtual object in a manner as if the object exists in the real world.

Prior Art Document

Patent Document

Patent Literature 1: JP 3558104 B

DISCLOSURE OR THE INVENTION

Problems to be Solved by the Invention

However, a conventional portable game device connectable to image pickup means is capable of merely generating a two-dimensional image in which a pickup object, such as a person existing in front of a lens, is projected on a two-dimensional projection plane. Accordingly, in some games, sufficient data cannot be obtained from the generated image, and hence the image has not been made full use of.

The present invention has been made in view of the above-mentioned problem, and therefore, it is an object of the present invention is to provide a portable game device and a method of controlling the portable game device capable of making improved use of an image generated by image pickup means.

Means for Solving the Problems

In order to solve the above-mentioned problem, a portable game device according to the present invention includes: image pickup means for picking up an image of a pickup object and generating a pickup object image; distance measuring means for measuring a distance to the pickup object; and information processing execution means for executing information processing based on the pickup object image and the distance measured by the distance measuring means.

Further, a method of controlling a portable game device according to the present invention includes: an image pickup step of picking up an image of a pickup object and generating a pickup object image; a distance measuring step of measuring a distance to the pickup object; and an information processing execution step of executing information processing based on the pickup object image and the distance measured in the distance measuring step.

According to the present invention, the pickup object image and the distance between the pickup object and the portable game device are used for information processing, to thereby make improved use of the image generated by the image pickup means.

In an aspect of the present invention, the distance measuring means sequentially measures the distance, and the information processing execution means changes, according to a change in the distance measured by the distance measuring means, contents of the information processing to be executed. With this configuration, the change in the distance between the pickup object and the portable game device may be used for information processing.

Further, in an aspect of the present invention, the information processing execution means displays, on display means, an image based on the distance measured by the distance measuring means. With this configuration, the change in the distance between the pickup object and the portable game device may be used for image display processing.

Further, in an aspect of the present invention, the distance measuring means sequentially measures the distance, and the information processing execution means is configured to: generate an image of a virtual space according to a position of a viewpoint disposed in the virtual space; display, on display means, the image of the virtual space thus generated; and change a position of the viewpoint in the virtual space, according to a change in the distance measured by the distance measuring means. With this configuration, the change in the distance between the pickup object and the portable game device may be used in the processing of displaying the image of the virtual image generated according to the position of the viewpoint disposed in the virtual space.

Further, in this aspect, the image pickup means may sequentially pick up an image of the pickup object and generate the pickup object image, and the information processing execution means may change, according to a change in the pickup object image picked up by the image pickup means, at least one of the position and an orientation of the viewpoint in the virtual space. With this configuration, the change in the pickup object image sequentially picked up may be used in the process of displaying the image of the virtual space generated according to the position of the viewpoint disposed in the virtual space.

Further, in an aspect of the present invention, the image pickup means and the distance measuring means are integrally formed.

Further, a portable game device according to the present invention includes image pickup means for picking up an image of a pickup object and generating a pickup object image, in which the image pickup means includes: a plurality of lenses; a reflective member for reflecting light; and an image pickup device for receiving the light reflected by the reflective member and generating the pickup object image, and in which the reflective member is supported so as to be movable between reflective member positions each for reflecting light passing through the respective lens, toward the image pickup device.

According to the present invention, images of pickup objects in different directions may be picked up and pickup object images may be collectively generated, to thereby make improved use of an image generated by the image pickup means.

In an aspect of the present invention, the portable game device further includes reflective member driving means for driving the reflective member so that the reflective member moves between the reflective member positions by following a predetermined rule. With this configuration, images of pickup objects in different directions may be picked up, to thereby generate images by following the predetermined rule.

A method of controlling a portable game device according to the present invention is a control method for a portable game device including image pickup means for picking up an image of a pickup object and generating a pickup object image, the image pickup means including: a plurality of lenses; a reflective member for reflecting light; and an image pickup device for receiving the light reflected by the reflective member and generating the pickup object image, the reflective member being supported so as to be movable between reflective member positions each for reflecting light passing through the respective lens, toward the image pickup device. The method of controlling a portable game device includes a reflective member driving step of driving the reflective member so that the reflective member moves between the reflective member positions by following a predetermined rule.

BRIEF DESCRIPTION OF DRAWINGS

FIG. 4B A view illustrating how an image of the virtual space is displayed on the display unit.

FIG. 4C A view illustrating how an image of the virtual space is displayed on the display unit.

FIG. 5A A view illustrating how an image of the virtual space is displayed on the display unit.

BEST MODE FOR CARRYING OUT THE INVENTION

In the following, an embodiment of the present invention is described in detail with reference to the drawings.

Figure 1:
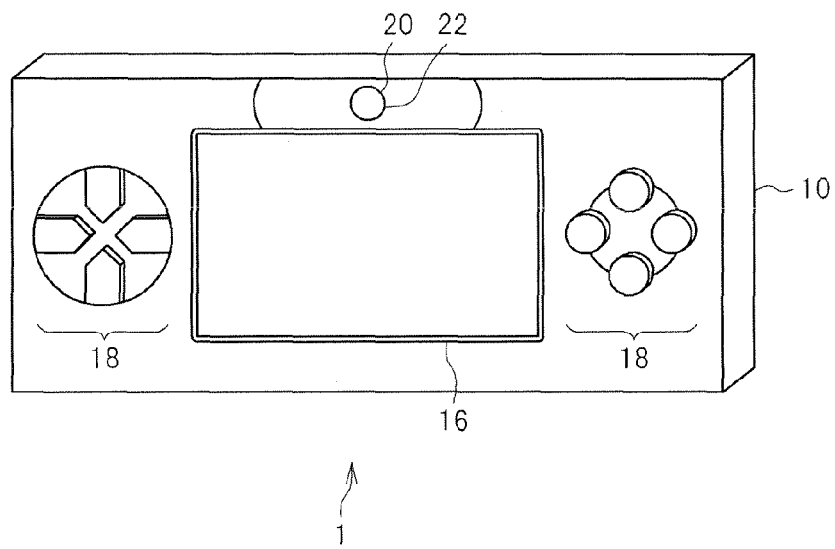
FIG. 1 A perspective view illustrating an example of a portable game device according to an embodiment of the present invention.
Figure 2:
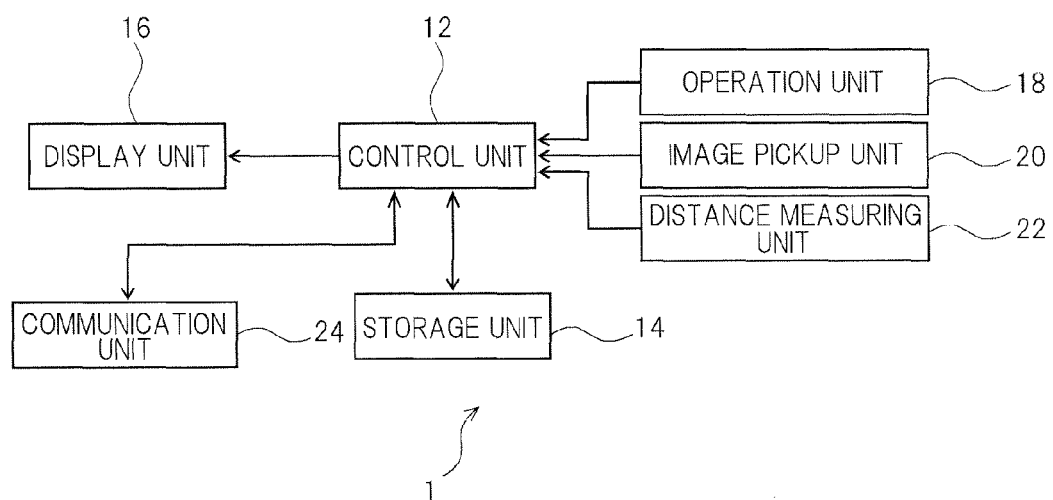
FIG. 2 A hardware configuration diagram illustrating an example of a hardware configuration of the portable game device according to the embodiment of the present invention.

FIG. 1 is a perspective view illustrating an example of a portable game device 1 according to this embodiment. FIG. 2 is a hardware configuration diagram illustrating an example of a hardware configuration of the portable game device 1 illustrated in FIG. 1. As illustrated in FIGS. 1 and 2, the portable game device 1 according to this embodiment has a housing 10 in a box shape. Further, the portable game device 1 according to this embodiment includes a control unit 12, a storage unit 14, a display unit 16, an operation unit 18, an image pickup unit 20, a distance measuring unit 22, and a communication unit 24.

The control unit 12 is a program control device such as a CPU, and operates based on a program (such as game program) stored in the storage unit 14.

The storage unit 14 is a memory element such as a RAM or a hard disk drive. The storage unit 14 stores a program or the like to be executed by the control unit 12. Specifically, the storage unit 14 stores, for example, a game program to be executed by the control unit 12. The game program is supplied to the portable game device 1 via an information transmitting medium such as a disk, a CD-ROM, or a DVD-ROM, or via a communications network such as the Internet. Further, the storage unit 14 operates as a work memory for the control unit 12.

The display unit 16 is, for example, a liquid crystal display or the like, and displays an image according to an instruction from the control unit 12. In this embodiment, the display unit 16 is provided in the center on a front surface of the housing 10 of the portable game device 1. Here, the control unit 12 may also give an instruction, to the display unit 16, regarding an attribute such as a resolution of an image or an aspect ratio to be displayed on the display unit 16. Further, the control unit 12 may give an instruction regarding an attribute of an image to be displayed on the display unit 16 according to the contents of attribute information on attributes such as a resolution of the image and an aspect ratio, which are included in a program to be executed.

The operation unit 18 is, for example, an operation member (specifically, for example, cross-shaped key or button), and outputs output data corresponding to an operation made to the operation member, to the control unit 12. The control unit 12 obtains the output data, to thereby execute, based on the output data, processing corresponding to the operation made to the operation member by a player. In this embodiment, the operation unit 18 is provided on each of both sides of the display unit 16 of the portable game device 1. Specifically, the operation unit 18 is disposed separately at the front right and at the front left of the housing 10 of the portable game device 1.

The image pickup unit 20 includes, for example, a known digital camera, and generates a black and white image, a gray scale image, or a color image (for example, image in JPEG format) at predetermined intervals (for example, every 1/60 seconds). Note that, the image pickup unit 20 may be a standard camera, a telescopic camera, or a wide-angle camera. In this embodiment, the image pickup unit 20 is disposed on an upper side of the display unit 16. Specifically, the image pickup unit 20 is disposed on an upper side near the center on the front surface of the housing 10.

The distance measuring unit 22 measures a distance between the portable game device 1 and an external object existing outside thereof. The distance measuring unit 22 measures, for example, a distance between a plane formed by a front surface of the portable game device 1 and the external object (more specifically, length of a perpendicular line extending from the external object to the plane formed by the front surface of the portable game device 1). Further, the distance measuring unit 22 associates each pixel contained in the image generated by the image pickup unit 20, with a distance between a point on the external object and the portable game device 1, corresponding to the pixel. The distance measuring unit 22 is specifically formed of, for example, a stereo camera including a plurality of lenses, and measures a distance between the external object and the portable game device 1, based on a parallax of each of the plurality of lenses. Needless to say, the distance measuring unit 22 is not limited to a stereo camera, and the distance measuring unit 22 may output an infrared ray and measure a time it takes for the infrared ray to reflect off a pickup object and return, to thereby measure a distance between the external object and the portable game device 1 based on the time thus measured. Further, the distance measuring unit 22 may include a plurality of lenses different in focal length, and measure a distance between the external object and the portable game device 1 based on one of the plurality of lenses, which is in focus with respect to the external object. Note that, in this embodiment, the distance measuring unit 22 is formed integrally with the image pickup unit 20, and disposed on an upper side of the display unit 16. Specifically, the distance measuring unit 22 is disposed on an upper side near the center on the front surface of the housing 10.

The communication unit 24 is, for example, a network interface (specifically, for example, wireless LAN module), and transmits information to another portable game device 1, a server (not shown) on the Internet or the like, according to an instruction input from the control unit 12. Further, the communication unit 24 outputs received information to the control unit 12.

Figure 3:
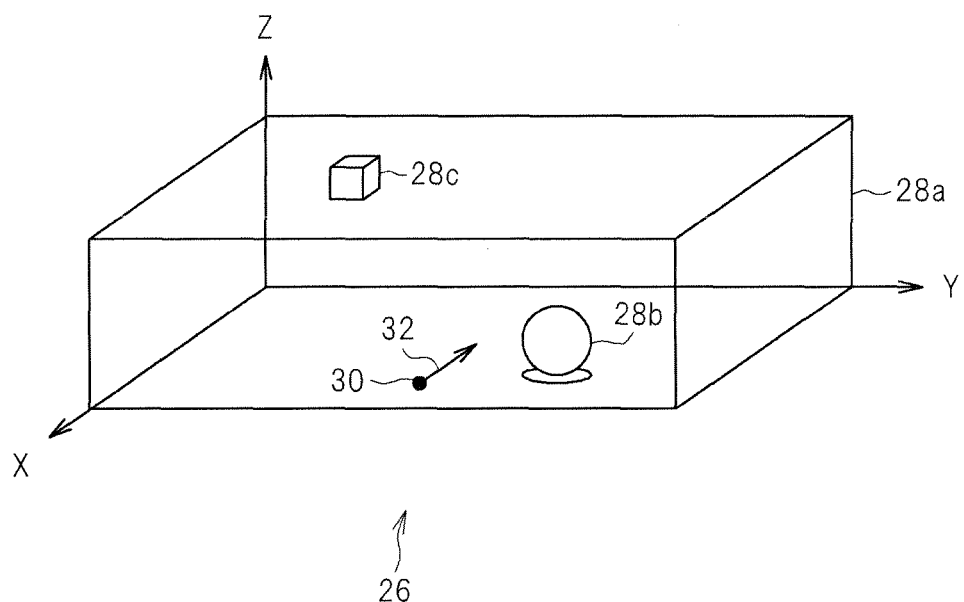
FIG. 3 A view illustrating an example of a virtual space.

In this embodiment, the portable game device 1 generates an image, based on positions of virtual objects 28, a position of an viewpoint 30, and a line of sight 32 in a virtual space 26 (virtual three-dimensional space in this embodiment) illustrated in FIG. 3, according to a position or an orientation of a face of a player 34 in front of the portable game device 1 as illustrated in FIGS. 4A to 4C or FIGS. 5A to 5C, and executes virtual space display processing of displaying the image thus generated.

Figure 4A:
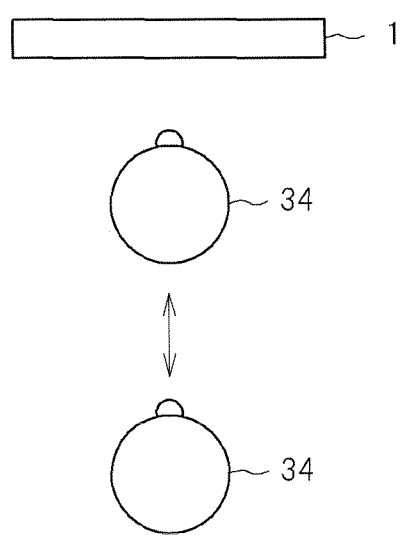
FIG. 4A A view illustrating how an image of the virtual space is displayed on a display unit.

Specifically, for example, when the face of the player 34 moves forward (see FIG. 4A), the viewpoint 30 in the virtual space 26 moves forward, with the result that an image of the virtual space 26 as illustrated in FIG. 4B is displayed on the display unit 16 such as a liquid crystal display. On the other hand, when the face of the player 34 moves backward (see FIG. 4A), the viewpoint 30 in the virtual space 26 moves backward, with the result that an image of the virtual space 26 as illustrated in FIG. 4C is displayed on the display unit 16.

Figure 5B:
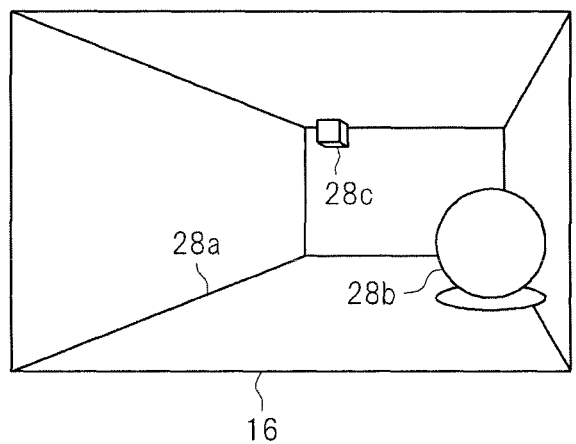
FIG. 5B A view illustrating how an image of the virtual space is displayed on the display unit.
Figure 5C:
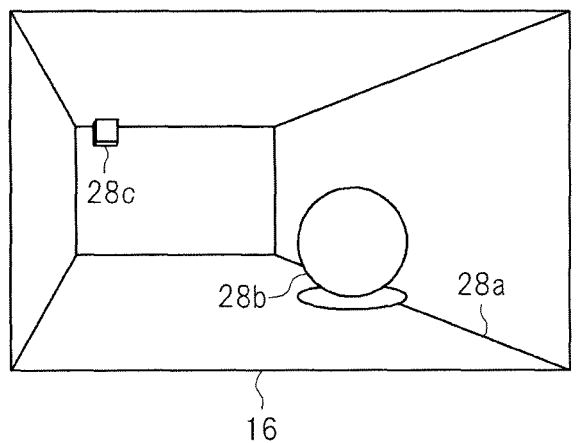
FIG. 5C A view illustrating how an image of the virtual space is displayed on the display unit.

Then, when the face of the player 34 turns counterclockwise with respect to the portable game device 1 (see FIG. 5A), the viewpoint 30 and the line of sight 32 in the virtual space 26 turn counterclockwise, with the result that an image of the virtual space 26 as illustrated in FIG. 5B is displayed on the display unit 16. On the other hand, when the face of the player 34 turns clockwise with respect to the portable game device 1 (see FIG. 5A), the viewpoint 30 and the line of sight 32 in the virtual space 26 turn clockwise, with the result that an image of the virtual space 26 as illustrated in FIG. 5C is displayed on the display unit 16.

Figure 6:
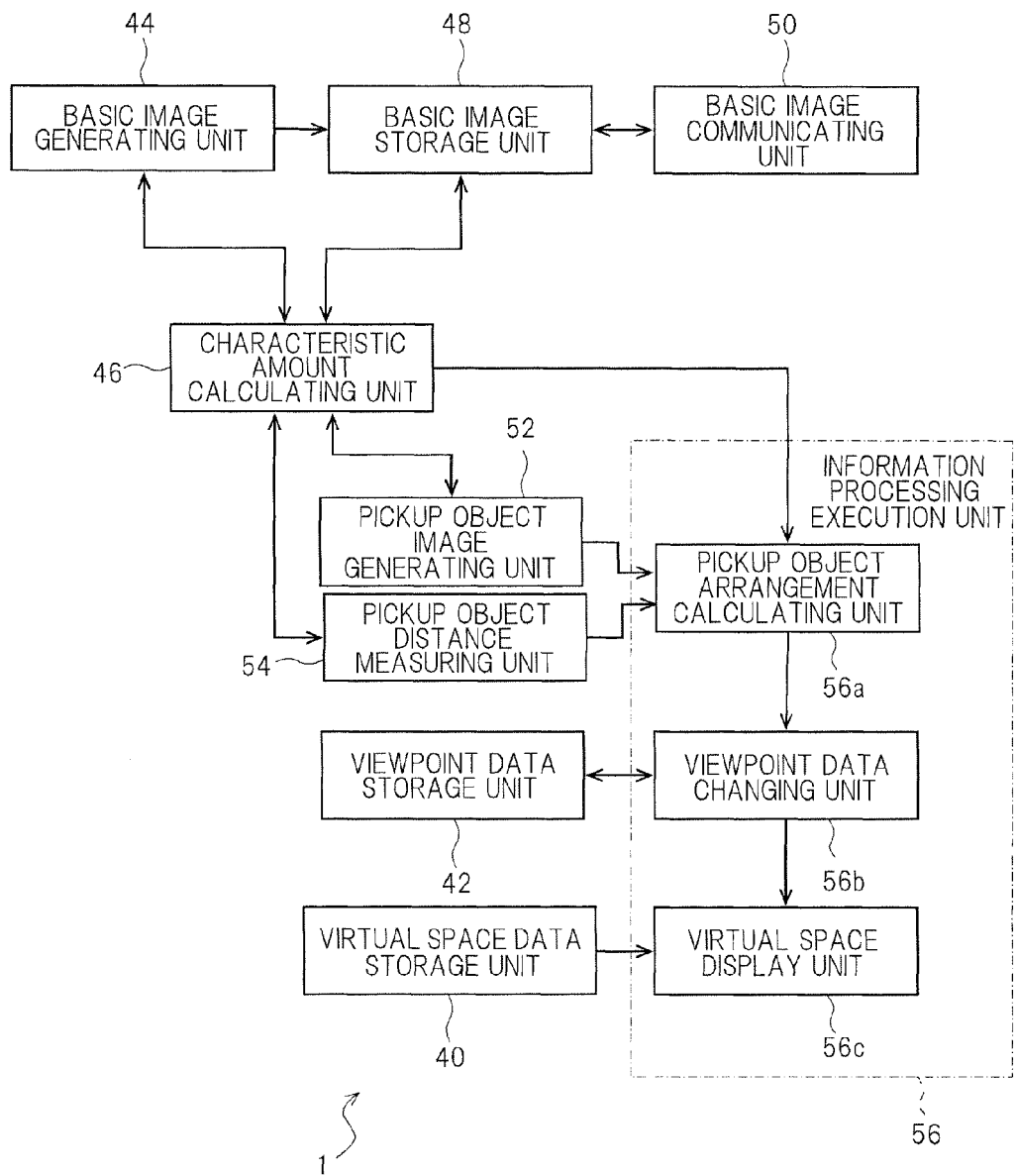
FIG. 6 A functional block diagram of the portable game device according to the embodiment of the present invention.

FIG. 6 is a functional block diagram of the portable game device 1 according to this embodiment of the present invention. As illustrated in FIG. 6, the portable game device 1 according to this embodiment includes, in terms of function, a virtual space data storage unit 40, a viewpoint data storage unit 42, a basic image generating unit 44, a characteristic amount calculating unit 46, a basic image storage unit 48, a basic image communicating unit 50, a pickup object image generating unit 52, a pickup object distance measuring unit 54, and an information processing execution unit 56 (including a pickup object arrangement calculating unit 56a, a viewpoint data changing unit 56b, and a virtual space display unit 56c), to thereby function as such.

The virtual space data storage unit 40 is implemented mainly by the storage unit 14. The virtual space data storage unit 40 stores, for example, virtual object positional data on a position (for example, coordinate value) of each of the virtual objects 28 in the virtual space 26 illustrated in FIG. 3. Specifically, for example, the virtual space data storage unit 40 stores the virtual object positional data indicating a position of a room virtual object 28a corresponding to a room, a position of a ball virtual object 28b in a spherical shape, and a position of a box virtual object 28c in a rectangular cubic shape (for example, three-dimensional coordinate value of each vertex of the object, three-dimensional coordinate value of the center of the sphere and a length of the radius thereof), as illustrated in FIG. 3. As illustrated in FIG. 3, in the virtual space 26, the ball virtual object 28b in a spherical shape and the box virtual object 28c in a rectangular cubic shape are arranged inside the room virtual object 28a in a box shape corresponding to a room. Then, the ball virtual object 28b is placed on a bottom surface of the room virtual object 28a, and the box virtual object 28c is placed as being in contact with an upper surface of the room virtual object 28a.

The viewpoint data storage unit 42 is implemented mainly by the storage unit 14. The viewpoint data storage unit 42 stores viewpoint data which contains, for example, viewpoint positional data indicating a position (for example, three-dimensional coordinate value) of the viewpoint 30 in the virtual space 26 and line-of-sight data indicating the line of sight 32 of the viewpoint 30, as illustrated in FIG. 3.

The basic image generating unit 44 is implemented mainly by the image pickup unit 20, the control unit 12, and the operation unit 18. The basic image generating unit 44 generates a basic image such as, for example, an image (player basic image 60) showing the player 34 as illustrated in FIG. 7.

Specifically, for example, the basic image generating unit 44 sequentially generates images at predetermined intervals, and performs control so that the generated images are sequentially displayed on the display unit 16 together with a frame image 62. At this time, the player 34 moves the portable game device 1 so that an image of the face of the player 34 (face image 64) fails within the frame image 62. At this time, the player 34 may move oneself instead, as a matter of course. In this state, when the player 34 operates the operation unit 18 (for example, presses a button), the basic image generating unit 44 stores, in the basic image storage unit 48 to be described later, an image displayed within the frame image 62 on the display unit 16, as the player basic image 60.

Figure 7:
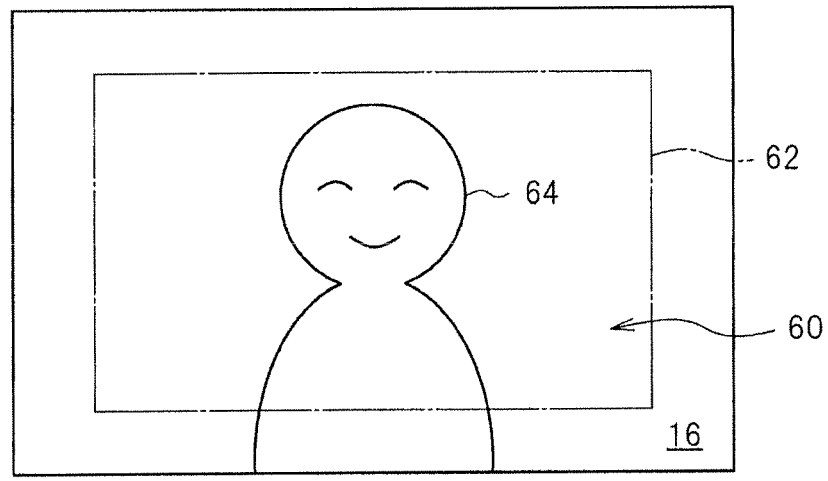
FIG. 7 A view illustrating an example of a player basic image.

Note that, the frame image 62 illustrated in FIG. 7 displayed on the display unit 16 may be configured to be changed in position or size by the player 34 through operation of the operation unit 18.

Alternatively, the basic image generating unit 44 may control, based on a distance obtained by the distance measuring unit 22 by measuring a distance between an external object corresponding to an image picked up by the image pickup unit 20 and the portable game device 1, the display unit 16 to display an image having pixels associated with measured distances shorter than a predetermined distance. Further, when the display unit 16 displays an image, the basic image generating unit 44 may control the display unit 16 to produce a visual effect according to a distance measured by the distance measuring unit 22. Specifically, for example, the basic image generating unit 44 may control the display unit 16 to produce a visual effect of, for example, immersing the face in water or profiling the face emerging from darkness, when the display unit 16 displays an image.

Further, in a case where the portable game device 1 is provided with a flash or a light, the basic image generating unit 44 may turn on the flash or the light when generating an image. In this manner, the basic image generating unit 44 may generate a basic image even in the darkness.

The characteristic amount calculating unit 46 is implemented mainly by the control unit 12. The characteristic amount calculating unit 46 calculates, based on the player basic image 60 illustrated in FIG. 7, a characteristic amount indicating characteristics of the player 34, by using an image processing technology such as a known pattern recognition technology. Here, the characteristic amount specifically includes, for example, the face image 64, a color of the skin (RGB value or HSV value), a position, a size, and a color (RGB value or HSV value) of the lips, a position and a size of each of the eyes and a distance therebetween, a position, a size, and a height of the nose, a position, a height, a width, and a color (RGB value or HSV value) of the eyebrow, a hair style, and a color of the hair.

Note that, the characteristic amount calculating unit 46 calculates the characteristic amount based also on a pickup object image to be described later. Details on how the characteristic amount calculating unit 46 calculates the characteristic amount based on a pickup object image are described later.

The basic image storage unit 48 is implemented mainly by the storage unit 14. The basic image storage unit 48 stores a basic image (player basic image 60 in this embodiment) generated by the basic image generating unit 44. The basic image storage unit 48 may store the basic image in association with a characteristic amount calculated by the characteristic amount calculating unit 46 based on the basic image.

Further, the basic image storage unit 48 may store a plurality of images, rather than a single image, by associating the images with one another. Alternatively, the basic image storage unit 48 may store, as the basic image, a composite image such as a motion portrait. Still alternatively, the basic image storage unit 48 may store the player basic images 60 in a plurality of expressions of, such as, delight, anger, sorrow, and pleasure. Specifically, for example, the basic image storage unit 48 may store not only the player basic image 60 of the player 34 facing front with respect to the portable game device 1, but also the player basic images 60 of the player 34 turning upward, downward, right, and left, by associating those player basic images 60 with one another.

Further, the basic image storage unit 48 may store, with respect to a plurality of kinds of the external objects, the basic image of each of the external objects in association with an object identifier for identifying the external object. Specifically, for example, the basic image storage unit 48 may store, with respect to a plurality of the players 34, the player basic image 60 of each of the players 34 in association with an ID or a name of the player 34.

Further, the basic image storage unit 48 may store data indicating a distance measured by the distance measuring unit 22, in association with each pixel in the basic image.

The basic image communicating unit 50 is implemented mainly by the control unit 12 and the communication unit 24. The basic image communicating unit 50 may transmit the basic image stored in the basic image storage unit 48, to a server (not shown) on the Internet via the communication unit 24 so that the basic image may be stored in a storage device provided to the server. Alternatively, the basic image communicating unit 50 may transmit, to the server via the communication unit 24, public availability information indicating whether or not to make the basic image available to the public.

Alternatively, the server may average the characteristic amounts associated with the basic images stored therein, to thereby generate an average basic image (for example, average face image). Further, the player 34 of the portable game device 1 may be allowed to download, via the communication unit 24, a basic image which is set to be available to the public or the average basic image.

Figure 8:
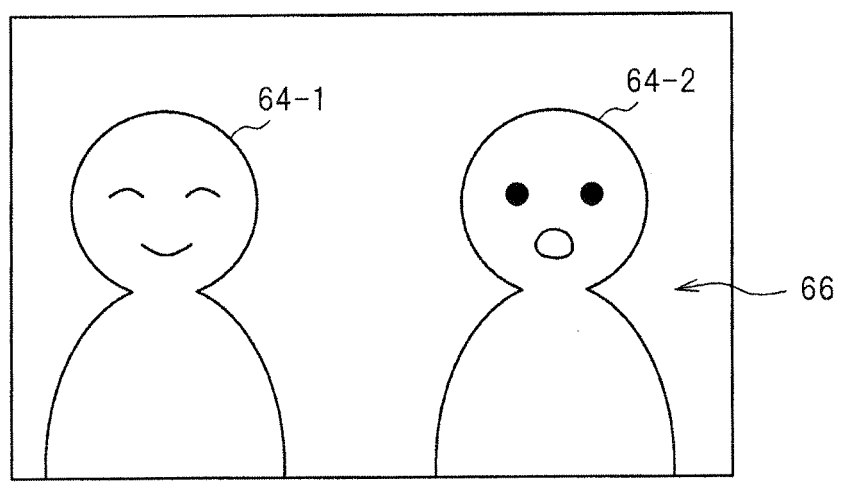
FIG. 8 A view illustrating an example of a player image.

The pickup object image generating unit 52 is implemented mainly by the image pickup unit 20. The pickup object image generating unit 52 picks up an image of a pickup object as a subject of image pickup, to thereby generate a pickup object image. In this embodiment, specifically, for example, the pickup object image generating unit 52 generates a player image 66 illustrated in FIG. 8. Note that, the player image 66 may include, as illustrated in FIG. 8, face images 64 of a plurality of the players 34 (first face image 64-1 of a first player 34-1, and second face image 64-2 of a second player 34-2). Needless to say, an image to be generated by the pickup object image generating unit 52 is not limited to the player image 66. Further, the pickup object image generating unit 52 may sequentially pick up images of pickup objects, to thereby generate pickup object images.

Note that, in a case where the portable game device 1 is provided with a flash or a light, the pickup object image generating unit 52 may turn on the flash or the light when generating an image. In this manner, the pickup object image generating unit 52 may generate a pickup object image even in the darkness, and the characteristic amount calculating unit 46 may calculate a characteristic amount based on the pickup object image.

Then, the characteristic amount calculating unit 46 described above calculates, by using an image processing technology such as a known pattern recognition technology, the above-mentioned characteristic amount based on the pickup object image (for example, player image 66) generated by the pickup object image generating unit 52.

At this time, the characteristic amount calculating unit 46 may compare the basic image (for example, player basic image 60) stored in the basic image storage unit 48 with the pickup object image (for example, player image 66), to thereby calculate the characteristic amount. Specifically, for example, as illustrated in FIG. 8, in a case where the player image 66 generated by the pickup object image generating unit 52 includes the plurality of images of the players 34, the characteristic amount calculating unit 46 may compare the player image 66 with the player basic image 60 which is associated with an identifier such as an ID of a specific player 34 (first player 34-1 in this case), to thereby calculate, by using a known pattern recognition technology, the face image 64 (first face image 64-1 in this case) of the specific player 34 based on the player image 66.

The pickup object distance measuring unit 54 is implemented mainly by the distance measuring unit 22. The pickup object distance measuring unit 54 measures a distance between the above-mentioned pickup object and the portable game device 1. In this embodiment, specifically, for example, a distance (player distance) between the player 34 (more specifically, for example, surface of the player 34) and the portable game device 1 is measured. Note that, the pickup object distance measuring unit 54 may sequentially measure a distance between a pickup object and the portable game device 1. The pickup object distance measuring unit 54 associates each pixel contained in a pickup object image (for example, player image 66) with the player distance of a point on the pickup object (for example, player 34), corresponding to the pixel.

The information processing execution unit 56 is implemented mainly by the control unit 12 and the display unit 16. The information processing execution unit 56 executes information processing based on the pickup object image (for example, player image 66) and a distance measured by the pickup object distance measuring unit 54. Specifically, for example, the information processing execution unit 56 executes information processing for displaying an image based on a distance measured by the pickup object distance measuring unit 54 on the display unit 16. Further, in this embodiment, the information processing execution unit 56 includes the pickup object arrangement calculating unit 56a, the viewpoint data changing unit 56b, and the virtual space display unit 56c.

The pickup object arrangement calculating unit 56a calculates, based on the pickup object image (for example, player image 66) and a distance measured by the pickup object distance measuring unit 54 (for example, player distance), an arrangement of the pickup object (for example, player 34) in a real space. Here, the pickup object arrangement calculating unit 56a may calculate, by using a characteristic amount calculated by the characteristic amount calculating unit 46 based on the pickup object image (for example, player image 66), an arrangement of the pickup object (for example, player 34) in a real space. Note that, the pickup object arrangement calculating unit 56a may sequentially calculate an arrangement of the pickup object in a real space. The pickup object arrangement calculating unit 56a calculates, specifically, for example, a relative coordinate value (for example, three-dimensional coordinate value) of the face of the player 34 in a real space with respect to the portable game device 1, and an orientation (for example, amount of rotation in the x-axis direction, an amount of rotation in the y-axis direction, and an amount of rotation in the z-axis direction) thereof with respect to the portable game device 1.

The viewpoint data changing unit 56b changes, based on a distance measured by the pickup object distance measuring unit 54, the viewpoint data stored in the viewpoint data storage unit 42. In a case where the pickup object distance measuring unit 54 is sequentially measuring a distance between the pickup object and the portable game device 1, the viewpoint data changing unit 56b may change the viewpoint data indicating a position of the viewpoint 30 in the virtual space 26, according to the change in the distance.

Here, the viewpoint data changing unit 56b may change at least one of the position and the orientation (line of sight 32) of the viewpoint 30 in the virtual space 26, according to the change in the pickup object image (for example, player image 66). In other words, the viewpoint data changing unit 56b may change at least one of the viewpoint positional data and the line-of-sight data stored in the viewpoint data storage unit 42, according to the change in the pickup object image (for example, player image 66).

In this embodiment, the viewpoint data changing unit 56b changes the viewpoint data stored in the viewpoint data storage unit 42, based on the arrangement of the pickup object (for example, player 34) in a real space calculated by the pickup object arrangement calculating unit 56a. Specifically, for example, the viewpoint data changing unit 56b changes the viewpoint data stored in the viewpoint data storage unit 42, based on a relative coordinate value (for example, three-dimensional coordinate value) of the face of the player 34 in a real space with respect to the portable game device 1, and an orientation (for example, amount of rotation in the x-axis direction, an amount of rotation in the y-axis direction, and an amount of rotation in the z-axis direction) thereof with respect to the portable game device 1.

Further, when it is calculated by the pickup object arrangement calculating unit 56a that the pickup object is arranged close to (or far from) the portable game device 1, the viewpoint data changing unit 56b may change the position of the viewpoint 30 forward (or backward) in the virtual space 26. Alternatively, when it is calculated by the pickup object arrangement calculating unit 56a that the pickup object is moving closer to (or away from) the portable game device 1, the viewpoint data changing unit 56b may move forward (or backward) the viewpoint 30 in the virtual space 26.

Further, when it is calculated by the pickup object arrangement calculating unit 56a that the pickup object is arranged relatively to the right (or to the left) with respect to the portable game device 1, the viewpoint data changing unit 56b may change the position of the viewpoint 30 to the right (or to the left) in the virtual space 26.

Further, when it is calculated by the pickup object arrangement calculating unit 56a that the pickup object is moving relatively to the right (or to the left) with respect to the portable game device 1, the viewpoint data changing unit 56b may move the viewpoint 30 to the right (or to the left) in the virtual space 26.

Further, when it is calculated by the pickup object arrangement calculating unit 56a that the pickup object is turning relatively counterclockwise (or clockwise) with respect to the portable game device 1, the viewpoint data changing unit 56b may turn the line of sight 32 of the viewpoint 30 counterclockwise (or clockwise) in the virtual space 26.

The virtual space display unit 56c generates an image of the virtual space 26 illustrated in FIG. 3, according to the position of the viewpoint 30 disposed in the virtual space 26, and displays the image thus generated of the virtual space 26. Specifically, for example, the virtual space display unit 56c displays an image depicting the virtual space 26 viewed from the position of the viewpoint 30 indicated by the viewpoint positional data contained in the viewpoint data changed by the viewpoint data changing unit 56b, in the line of sight 32 indicated by the line-of-sight data contained in the viewpoint data.

Note that, the information processing executed by the information processing execution unit 56 is not limited to the information processing executed by the pickup object arrangement calculating unit 56a, the viewpoint data changing unit 56b, and the virtual space display unit 56c. For example, the distance measuring unit 22 may sequentially measure a distance between the pickup object and the portable game device 1, and the information processing execution unit 56 may execute processing of changing the contents of the processing to be executed by the control unit 12, according to the change in the distance thus measured. Further, the information processing executed by the information processing execution unit 56 is not limited to the information processing for displaying information on the display unit 16.

Figure 9:
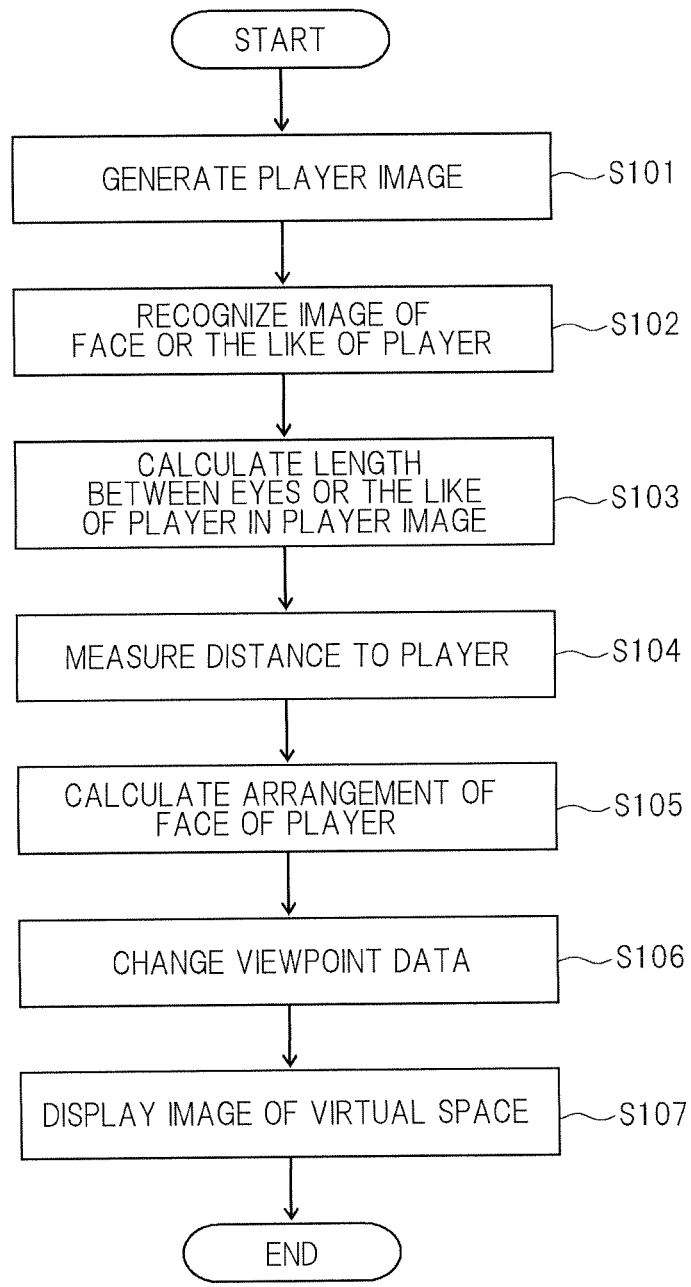
FIG. 9 A diagram illustrating an example of a flow of processing performed in the portable game device according to the embodiment of the present invention.

Next, with reference to a flow chart of FIG. 9, a description is given of an example of a flow of processing of displaying an image of the virtual space 26 according to a position and an orientation of the face of the player 34 when the player 34 is in front of the portable game device 1, in a case where the player basic image 60 of a predetermined player 34 is stored in the basic image storage unit 48 in association with the face image 64 of the player 34 extracted from the player basic image 60. Note that, at this time, the storage unit 14 stores virtual object positional data indicating a position (for example, coordinate value) of each virtual object 28 in the virtual space 26 illustrated in FIG. 3. Further, the viewpoint data storage unit 42 stores the viewpoint data which contains the viewpoint positional data indicating a position (for example, coordinate value) of the viewpoint 30 in the virtual space 26, and the line-of-sight data indicating the line of sight 32 of the viewpoint 30. Note that, in this processing example, the image pickup unit 20 is formed of a high frame rate camera with a variable frame rate.

First, the pickup object image generating unit 52 generates the player image 66 of the player 34 (S101).

Then, the characteristic amount calculating unit 46 compares the player image 66 with the player basic image 60 of the player 34, to thereby calculate images of the face, the eyes, the nose, and the mouth of the player 34 (S102).

Then, the characteristic amount calculating unit 46 calculates at least one of the lengths between the eyes, between the eye and the nose, and between the nose and the mouth of the player 34, on the player image 66 (S103).

Then, the pickup object distance measuring unit 54 measures distances (player distances) to the eyes, the nose, and the mouth of the player 34 from the portable game device 1, and associates each of the distances with each pixel contained in the player image 66 (S104).

Then, the pickup object arrangement calculating unit 56a calculates, based on the player image 66 and the player distance, the arrangement of the player 34 in the real space (S105). Specifically, the pickup object arrangement calculating unit 56a calculates a relative amount of rotation of the face of the player 34 in the x-axis direction, in the y-axis direction, and in the z-axis direction with respect to the portable game device 1, and a relative coordinate value of the face of the player 34 with respect to the portable game device 1.

Then, the viewpoint data changing unit 56b changes at least one of the viewpoint positional data indicating a position of the viewpoint 30 in the virtual space 26 and the line-of-sight data indicating the line of sight 32 which are stored in the viewpoint data storage unit 42, based on the position and the orientation of the face of the player 34 determined by the three-dimensional coordinate value calculated in the process of S105 (S106).

Then, the virtual space display unit 56c displays, in the virtual space 26, an image depicting a scene viewed from the position of the viewpoint 30 indicated by the viewpoint positional data, in the line of sight 32 indicated by the line-of-sight data, the viewpoint positional data and the line-of-sight data being contained in the viewpoint data changed in the process of S105 (S107). Note that, at this time, the display unit 16 may display an image with an attribute such as a resolution or an aspect ratio according to an instruction from the control unit 12.

In the manner as described above, for each frame, an image depicting a scene of the virtual space 26 is displayed on the display unit 16 such as a liquid crystal display.

In the processes of S102 and S103 in the above-mentioned processing example, in a case where the characteristic amount calculating unit 46 cannot calculate the characteristic amount such as an image of the face, the eyes, the nose, or the mouth of the player 34 or at least one of lengths between the eyes, between the eye and the nose, and between the nose and the mouth of the player 34, on the player image 66, the virtual space display unit 56c may display, on the display unit 16 such as a liquid crystal display, an image obtained on the analogy of an image most recently displayed on the display unit 16 such as a liquid crystal display.

Further, in the above-mentioned case, the processes of S101 to S103 may be executed again with an increased frame rate of the image pickup unit 20. In this case, in a case where the characteristic amount cannot be calculated based on the player image 66 even when the processes of S101 to S103 are executed predetermined times, an image most recently displayed on the display unit 16 such as a liquid crystal display may be displayed on the display unit 16 such as a liquid crystal display. Note that, in this case, the storage unit 14 may store error count data, and the control unit 12 may increase a value of the error count data by one in a case where the characteristic amount cannot be calculated based on the player image 66 even when the processes of S101 to S103 are executed predetermined times. Then, when a time longer than a predetermined time has elapsed without being able to calculate the characteristic amount based on the player image 66 or when the value of the error count data has exceeded a predetermined value, the control unit 12 may display an error message on the display unit 16. Note that, in a case where the portable game device 1 is provided with a built-in vibrator (vibrator), a speaker, or an LED, the control unit 12 may vibrate the vibrator, may produce a warning beep from the speaker provided to the portable game device 1, or may flash the LED provided to the portable game device 1, when a time longer than a predetermined time has elapsed without being able to calculate the characteristic amount based on the player image 66 or when the value of the error count data has exceeded a predetermined value.

Next, an example where the above-mentioned embodiment is applied to a game of shogi is described below.

Figure 10:
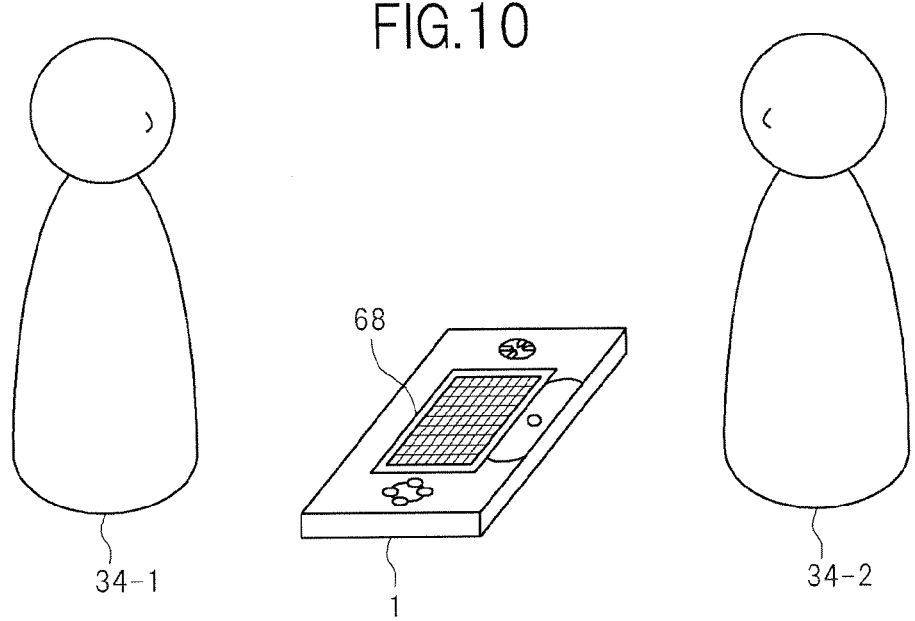
FIG. 10 An explanatory diagram illustrating an example in which the portable game device according to the embodiment of the present invention is applied for use in playing a game of shogi.

As illustrated in FIG. 10, the first player 34-1 and the second player 34-2 face each other across the portable game device 1. Then, a shogi board image 68 is displayed on the display unit 16 of the portable game device 1. The shogi board image 68 is an example of the virtual object 28 in the virtual space 26 described above.

Then, when the first player 34-1 makes a move, the control unit 12 controls the display unit 16 so that the shogi board image 68 is displayed according to the relative position and the orientation of the face of the first player 34-1 with respect to the portable game device 1. This way makes it difficult for the second player 34-2 to see the shogi board image 68. On the other hand, when the second player 34-2 makes a move, the control unit 12 controls the display unit 16 so that the shogi board image 68 is displayed according to the relative position and the orientation of the face of the second player 34-2 with respect to the portable game device 1. This way makes it difficult for the first player 34-1 to see the shogi board image 68.

Alternatively, this embodiment maybe applied to a first-person shooter (FPS). Specifically, for example, in a case where an image of the face of the player 34 cannot be calculated by the characteristic amount calculating unit 46, the control unit 12 may execute processing of the game for dodging a bullet or an attack, or loading bullets.

Further, the portable game device 1 according to this embodiment may be applied to an authentication process in a game. Specifically, for example, when a title screen of a game is displayed on the display unit 16 and the player 34 brings the face closer to the image pickup unit 20 of the portable game device 1, the control unit 12 may identify the player 34 bringing the face closer to the image pickup unit 20, based on the characteristic amount calculated by the characteristic amount calculating unit 46 based on the player image 66 generated by the pickup object image generating unit 52, to thereby authenticate the player 34. At this time, in a case where the player 34 cannot be identified, the control unit 12 may authenticate the player 34 as an anonymous player. In this case, the portable game device 1 may be configured to allow the player basic image 60 to be updated. The above-mentioned updating function of the player basic image 60 may be used before the control unit 12 of the portable game device 1 starts various kinds of information processing.

According to this embodiment, three-dimensional visual imagery may be attained in much the same way as in the real world, to thereby make improved use of an image generated by the image pickup unit 20.

Next, another embodiment of the present invention is described with reference to the drawings.

A portable game device 1 according to this embodiment is similar in hardware configuration to that of FIG. 2.

Figure 11A:
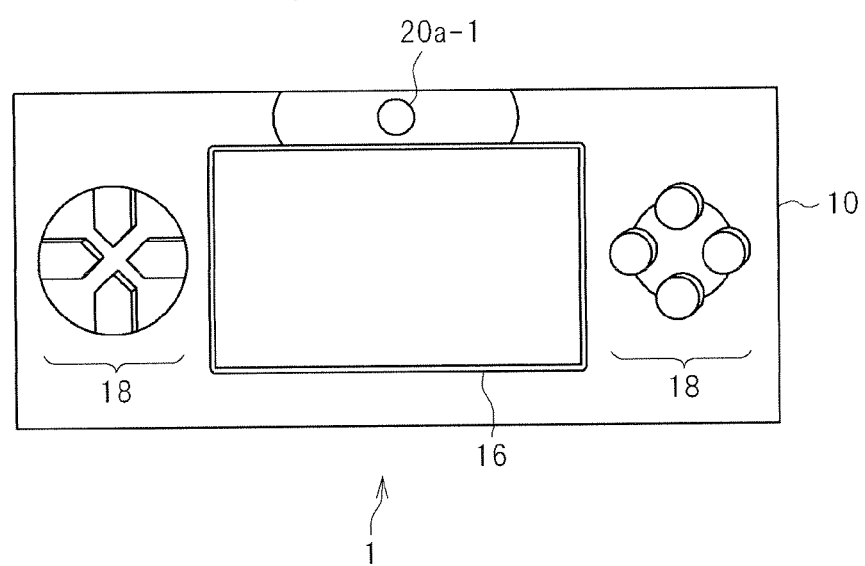
FIG. 11A A view illustrating an example of a portable game device according to another embodiment of the present invention.
Figure 11B:
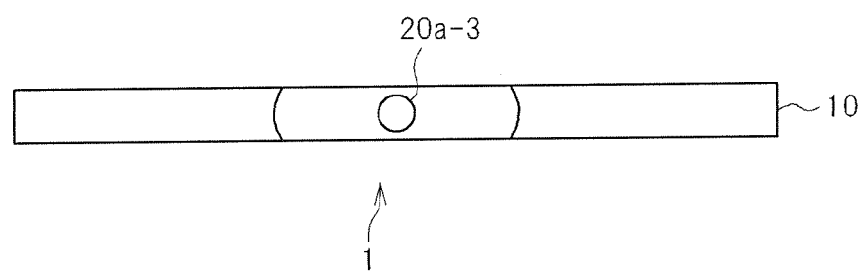
FIG. 11B A view illustrating the example of the portable game device according to the another embodiment of the present invention.
Figure 11C:
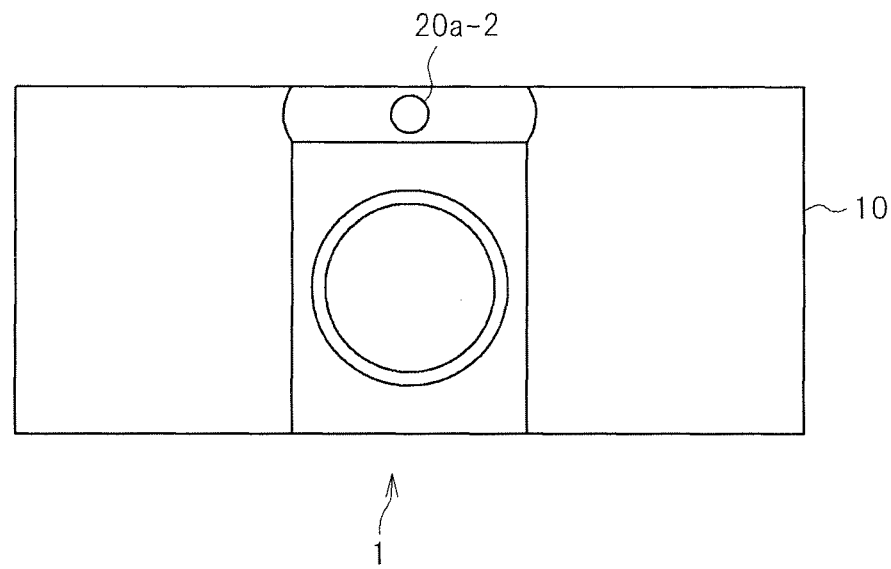
FIG. 11C A view illustrating the example of the portable game device according to the another embodiment of the present invention.

FIG. 11A is a front view of the portable game device 1 according to this embodiment. FIG. 11B is a top side view of the portable game device 1 according to this embodiment. FIG. 11C is a back side view of the portable game device 1 according to this embodiment.

FIGS. 12A, 12B, 13A, and 13B are schematic diagrams each illustrating an example of an overview of a configuration of the image pickup unit 20 of the portable game device 1 according to this embodiment. As illustrated in FIGS. 12A, 12B, 13A, and 13B, the image pickup unit 20 of the portable game device 1 according to this embodiment includes optical systems 20a (front optical system 20a-1, rear optical system 20a-2, and upper optical system 20a-3), shutters 20b (front shutter 20b-1, rear shutter 20b-2, and upper shutter 20b-3), reflective members 20c (first reflective member 20c-1 and second reflective member 20c-2), and an image pickup device 20d.

In this embodiment, the front optical system 20a-1 is disposed on an upper side near the center on the front surface of the portable game device 1, the rear optical system 20a-2 is disposed on an upper side near the center on the rear surface of the portable game device 1, and the upper optical system 20a-3 is disposed slightly to the left with respect to the center on the top side surface of the portable game device 1. Each optical system 20a may be formed of a single lens, or a plurality of lenses. Further, the type of a lens forming each optical system 20a is not particularly limited, and may be a standard lens, a wide-angle lens, or a telescopic lens.

In this embodiment, the front shutter 20b-1 is disposed on an inner side of the front optical system 20a-1, the rear shutter 20b-2 is disposed on an inner side of the rear optical system 20a-2, and the upper shutter 20b-3 is disposed on an inner side of the upper optical system 20a-3. Note that, these shutters 20b may be disposed on outer sides of the optical systems 20a.

The reflective members 20c each are a member for reflecting light, and formed of, for example, a mirror. In this embodiment, the reflective members 20c are each in a plate-like shape, and disposed in the inside of the portable game device 1.

The image pickup device 20d is, for example, a CCD image sensor or a CMOS image sensor, and receives light reflected from the reflective member 20c, to thereby generate an image (image data). Specifically, the image pickup device 20d subjects the received light to photoelectric conversion to generate an electric signal, and then generates an image (image data) based on the electric signal.

Then, the first reflective member 20c-1 is disposed in the inside of the portable game device 1 on an upper side near the center, with a plane formed by the first reflective member 20c-1 being vertically oriented. The first reflective member 20c-1 is supported so as to be movable between reflective member positions each for reflecting light passing through the front optical system 20a-1 or the rear optical system 20a-2 toward the image pickup device 20d. In this embodiment, the first reflective member 20c-1 is supported so as to be pivotable about a vertical axis. Specifically, for example, a vertical supporting member (not shown) penetrating the first reflective member 20c-1 is provided, and the supporting member supports the first reflective member 20c-1 in a pivotable manner.

Figure 12A:
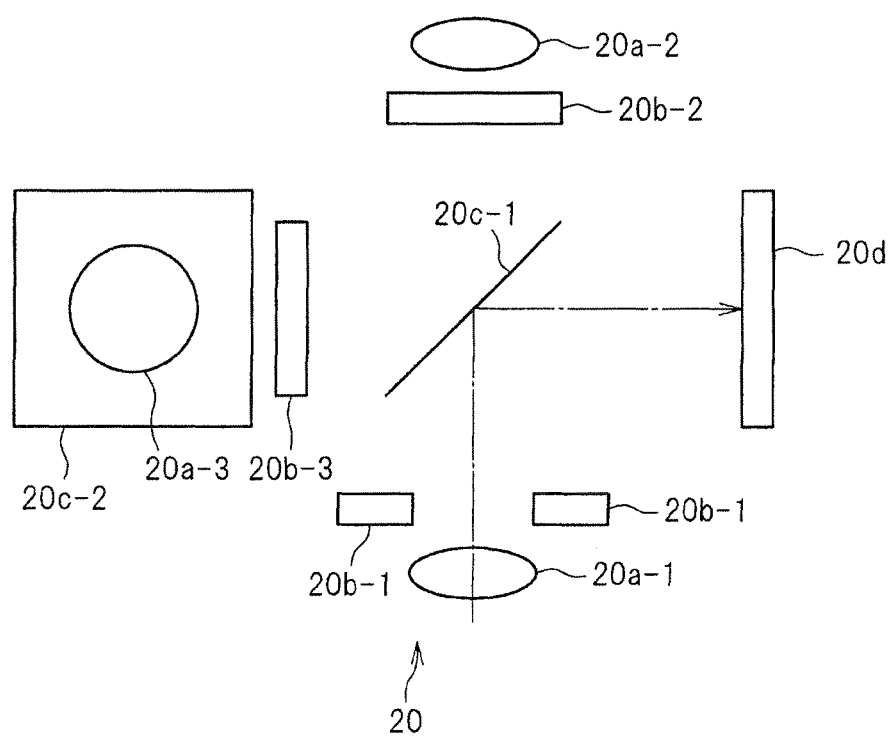
FIG. 12A A schematic diagram illustrating an example of an overview of a configuration of an image pickup unit of the portable game device according to the another embodiment of the present invention.
Figure 12B:
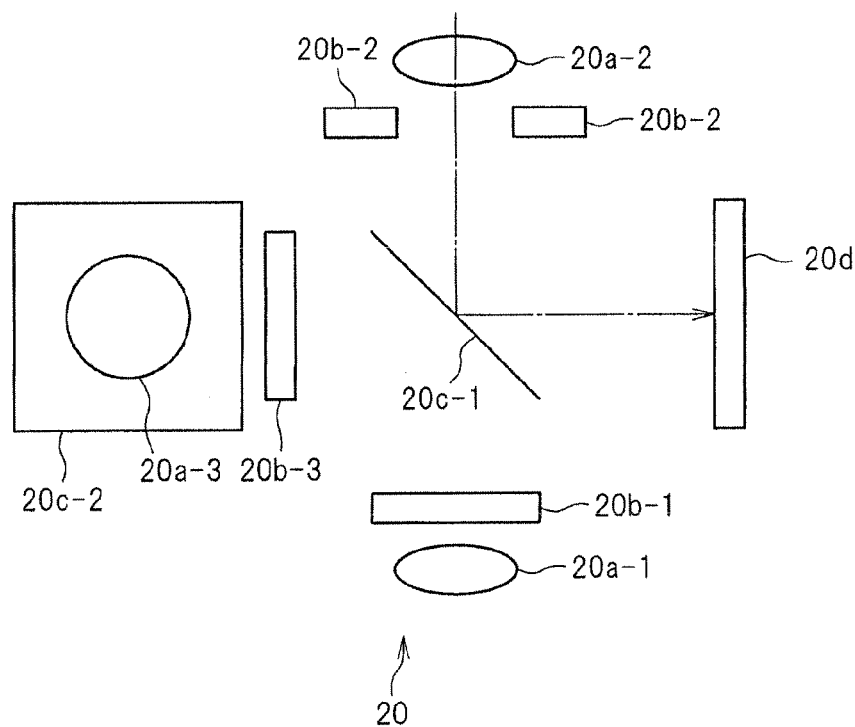
FIG. 12B A schematic diagram illustrating the example of the overview of the configuration of the image pickup unit of the portable game device according to the another embodiment of the present invention.

In this embodiment, the first reflective member 20c-1 is supported so as to be pivotable between a front reflective member position (position in which the first reflective member 20c-1 is disposed as illustrated in FIG. 12A) for reflecting light passing through the front optical system 20a-1 toward the image pickup device 20d and a rear reflective member position (position in which the first reflective member 20c-1 is disposed as illustrated in FIG. 12B) for reflecting light passing through the rear optical system 20a-2 toward the image pickup device 20d.

Then, the front shutter 20b-1 opens when the first reflective member 20c-1 is moved to the front reflective member position, while the rear shutter 20b-2 opens when the second reflective member 20c-1 is moved to the rear reflective member position.

Further, the portable game device 1 may include a reflective member driving unit (not shown) such as an actuator, and the reflective member driving unit may drive the first reflective member 20c-1 so that the first reflective member 20c-1 is moved between the reflective member positions. Alternatively, the control unit 12 may drive the reflective member driving unit. At this time, the reflective member driving unit may drive the first reflective member 20c-1 so that the first reflective member 20c-1 is moved to one of the reflective member positions in time when the image pickup device 20d receives light and generates an image.

In this embodiment, the control unit 12 of the portable game device 1 operates the reflective members 20c and the shutters 20b, so that the image pickup unit 20 picks up an image of a pickup object at a predetermined frame rate and generates a pickup object image.

Figure 13A:
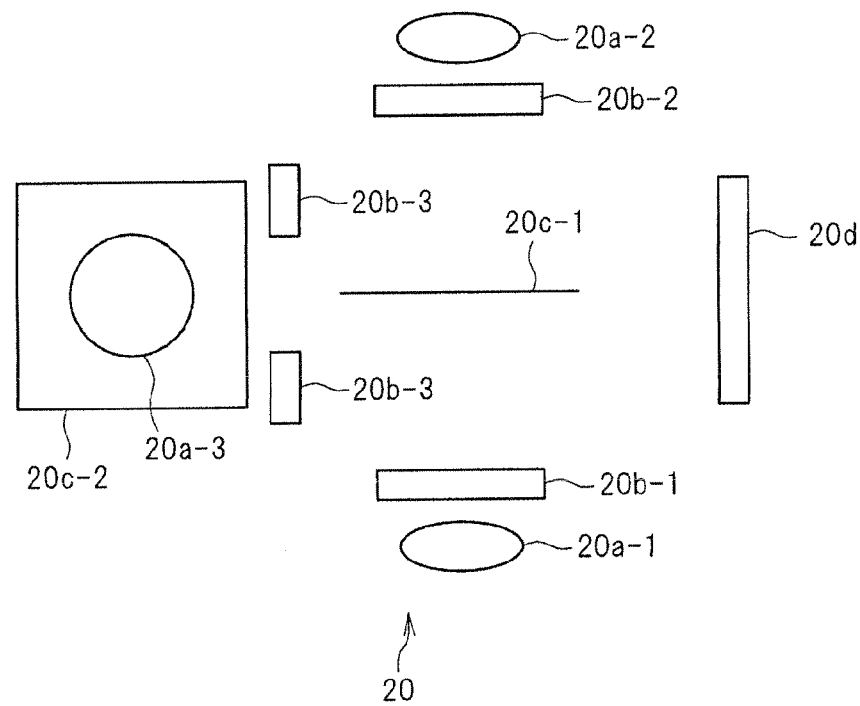
FIG. 13A A schematic diagram illustrating the example of the overview of the configuration of the image pickup unit of the portable game device according to the another embodiment of the present invention.
Figure 13B:
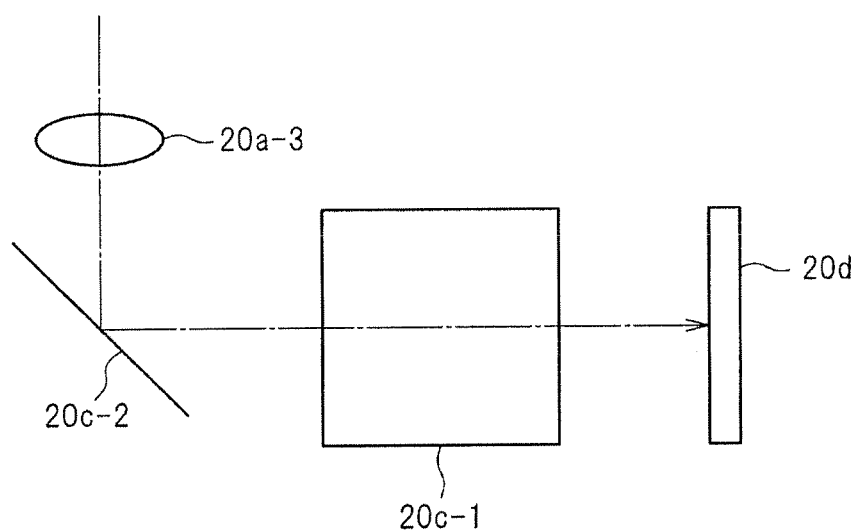
FIG. 13B A schematic diagram illustrating the example of the overview of the configuration of the image pickup unit of the portable game device according to the another embodiment of the present invention.

FIG. 13A illustrates a schematic configuration of the image pickup unit 20 viewed from above in a state where the upper shutter 20b-3 is opened. Further, FIG. 13B illustrates a schematic configuration of the image pickup unit 20 viewed from front in the state where the upper shutter 20b-3 is opened. As illustrated in FIGS. 13A and 13B, the second reflective member 20c-2 is disposed in a manner that a reflecting surface of the second reflective member 20c-2 is oriented at an angle with respect to a horizontal direction, so that light passing through the upper optical system 20a-3 is reflected toward the image pickup device 20d. The second reflective member 20c-2 is disposed slightly to the left with respect to the center on the upper side of the portable game device 1.

Figure 14:
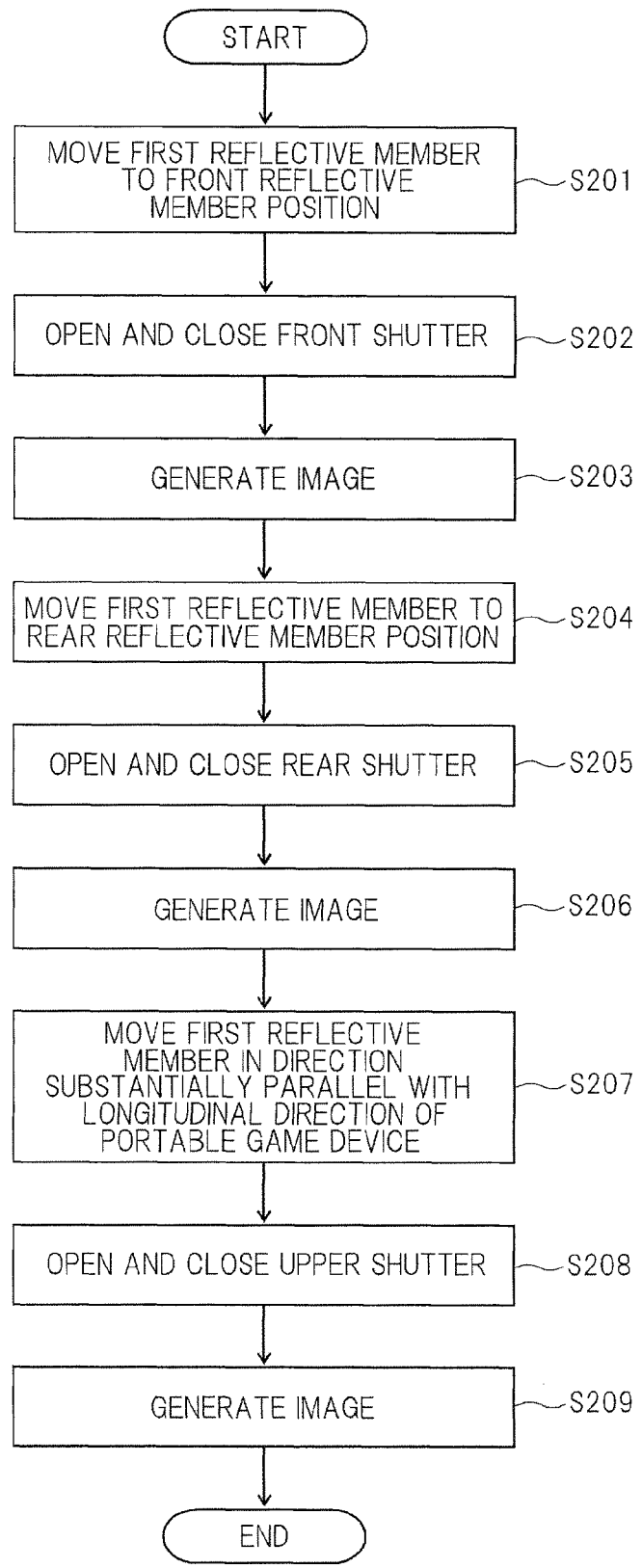
FIG. 14 A diagram illustrating an example of a flow of processing performed in the portable game device according to the another embodiment of the present invention.

Next, with reference to a flow chart of FIG. 14, a description is given of an example of a flow of processing of displaying a moving image according to this embodiment.

First, the reflective member driving unit moves the first reflective member 20c-1 to the front reflective member position (S201).

Next, the control unit 12 opens and closes the front shutter 20b-1 (S202).

Then, the first reflective member 20c-1 reflects light passing through the front optical system 20a-1 and the front shutter 20b-1 toward the image pickup device 20d, and the image pickup device 20d receives the light and generates an image (S203) (see FIG. 12A).

Then, the reflective member driving unit moves the first reflective member 20c-1 to the rear reflective member position (S204).

Next, the control unit 12 opens and closes the rear shutter 20b-2 (S205).

Then, the first reflective member 20c-1 reflects light passing through the rear optical system 20a-2 and the rear shutter 20b-2 toward the image pickup device 20d, and the image pickup device 20d receives the light and generates an image (S206) (see FIG. 12B).

Then, the reflective member driving unit moves the first reflective member 20c-1 so that the reflecting surface of the first reflective member 20c-1 is arranged substantially in parallel with the longitudinal direction of the portable game device 1 (S207).

Next, the control unit 12 opens and closes the upper shutter 20b-3 (S208).

Then, the second reflective member 20c-2 reflects light passing through the upper optical system 20a-3 and the upper shutter 20b-3 toward the image pickup device 20d, and the image pickup device 20d receives the light and generates an image (S209) (see FIGS. 13A and 13B).

Then, after the processes of S201 to S209 are repeated, the control unit 12 combines a series of images generated in the process of S203, to thereby generate a moving image. Further, the control unit 12 combines a series of images generated in the process of S206, to thereby generate another moving image. Still further, the control unit 12 combines a series of images generated in the process of S209, to thereby generate a further moving image. In the manner as described above, the portable game device 1 according to this embodiment is capable of picking up images of pickup objects in different directions and collectively generating pickup object images, to thereby make improved use of an image generated by the image pickup unit 20.

Then, for example, in a case where the portable game device 1 according to this embodiment includes the image pickup unit 20 that has a frame rate of 240 fps, the portable game device 1 collectively generates three moving images (front moving image, rear moving image, and upper moving image) each having a frame rate of 80 fps, through the processing illustrated in the above-mentioned processing example.

Note that, the above-mentioned processing example is merely an example of processing of generating a moving image. For example, the reflective member driving unit may drive the first reflective member 20c-1 so that the first reflective member 20c-1 is moved between the reflective member positions following a predetermined rule different from the above-mentioned rule, which allows the portable game device 1 according to this embodiment to generate various moving images.

Specifically, for example, the processes of S201 to S206 in the above-mentioned processing example maybe repeated, to thereby allow the portable game device 1 to collectively generate two moving images (front moving image and rear moving image) each having a frame rate of 120 fps in a case where the portable game device 1 according to this embodiment includes the image pickup unit 20 that has a frame rate of 240 fps.

Alternatively, the processes of S201 to S203 may be repeated twice and the processes of S204 to S206 may be executed once, to thereby allow the portable game device 1 to collectively generate a moving image (front moving image) having a frame rate of 160 fps and a moving image (rear moving image) having a frame rate of 80 fps in a case where the portable game device 1 according to this embodiment includes the image pickup unit 20 that has a frame rate of 240 fps. The present invention may be used in various applications.

For example, the present invention maybe combined with the virtual space display processing described in the above-mentioned embodiment, to thereby display an image rendering augmented reality. Specifically, for example, first, the image pickup unit 20 picks up an image of an object (for example, a diagram or a character) disposed in a direction of the rear optical system 20a-2. Then, the control unit 12 generates, based on the image of the object thus picked up, virtual object positional data indicating the position of the virtual object 28. Then, the virtual space data storage unit 40 stores the virtual object positional data. Then, the image pickup unit 20 picks up an image of a pickup object disposed in the direction of the front optical system 20a-1. Then, the viewpoint data changing unit 56b changes, based on the image of the pickup object thus picked up, the viewpoint data stored in the viewpoint data storage unit 42. Then, the virtual space display unit 56c displays an image of the virtual space 26 generated according to the changed position of the viewpoint 30, on the display unit 16 such as a liquid crystal display. In this manner, an image rendering augmented reality may be displayed.

Alternatively, the present invention may be combined with a known pattern recognition technology, to thereby easily generate a moving image that follows a pickup object moving in various directions.

As described above, according to this embodiment, a plurality of images (moving images) are collectively generated, which makes improved use of an image generated by the image pickup unit 20.

Note that, the scope of application of the present invention is not limited to the above-mentioned embodiments.

Specifically, for example, the layout of the optical systems 20a, the shutters 20b, the reflective members 20c, and the image pickup device 20d is not limited to that of the above-mentioned embodiment, as long as the image pickup device 20d is capable of receiving light reflected from the reflective members 20c.

Figure 15:
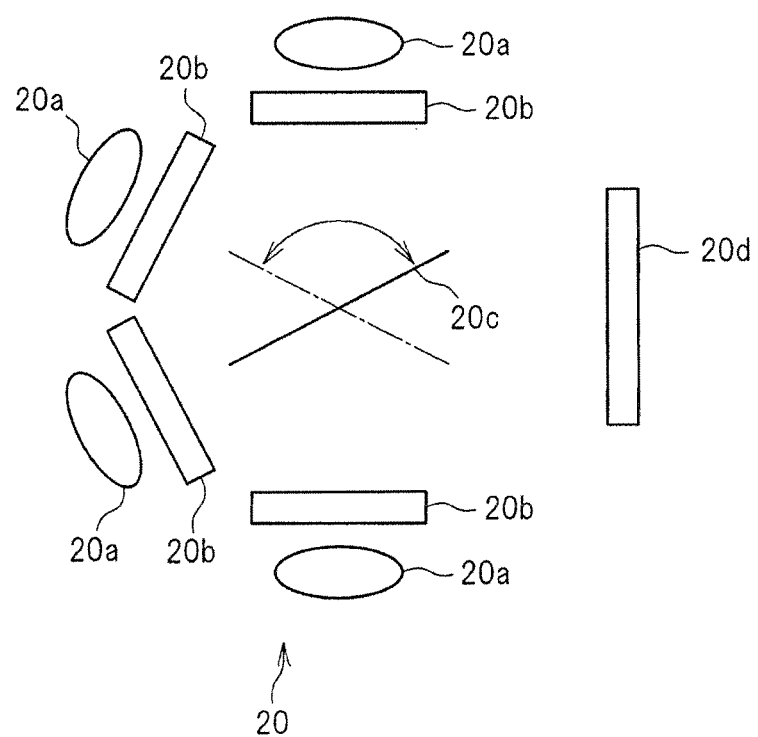
FIG. 15 A schematic diagram illustrating an example of an overview of a configuration of the image pickup unit of the portable game device according to a further embodiment of the present invention.

Further, the numbers of the optical systems 20a and the shutters 20b are not limited to those of the above-mentioned embodiment. For example, as illustrated in FIG. 15, the portable game device 1 may include the optical systems 20a and the shutters 20b in four directions. With this configuration, the portable game device 1 is capable of collectively generating four moving images.

Alternatively, the portable game device 1 may not necessarily include a physical shutter 20b.

The invention claimed is:

1. A portable game device, comprising a control unit and an image pickup unit for generating an image,
wherein the image pickup unit comprises:
    a plurality of lenses including a first lens and a second lens;
    a plurality of shutters including a first shutter and a second shutter;
    a reflective member which is supported and movable for reflecting light; and
    a reflective member driving unit for moving the reflective member; and
    an image pickup device for receiving the light reflected by the reflective member and generating the image,
wherein the image pickup unit repeats a plurality of processes including:
(i) moving the reflective member to a first position where the reflective member reflects light passing through the first lens and the first shutter toward the image pickup device;
(ii) opening and closing the first shutter;
(iii) receiving the light passing through the first lens and the first shutter and generating an image;
(iv) moving the reflective member to a second position where the reflective member reflects light passing through the second lens and the second shutter toward the image pickup device;
(v) opening and closing the second shutter; and
(vi) receiving the light passing through the second lens and the second shutter and generating an image, and
wherein, after the image pickup unit repeats the processes, the control unit generates a plurality of moving images including a first moving image and a second moving image, the first moving image being generated by combining a series of images generated by the image pickup device when the image pickup device receives the light passing through the first lens and the first shutter and the second moving image being generated by combining a series of images generated by the image pickup device when the image pickup device receives the light passing through the second lens and the second shutter, and
wherein the image pickup unit sequentially implements steps (i) to (vi) and repeats a cycle including steps (i) to (vi).

2. A method of controlling a portable game device comprising an image pickup unit for generating an image,
the image pickup unit comprising:
    a plurality of lenses including a first lens and a second lens;
    a plurality of shutters including a first shutter and a second shutter;
    a reflective member which is supported and movable for reflecting light; and
    an image pickup device for receiving the light reflected by the reflective member and generating the image,
wherein the method of controlling a portable game device repeats a plurality of processes including:
(i) moving the reflective member to a first position where the reflective member reflects light passing through the first lens and the first shutter toward the image pickup device;
(ii) opening and closing the first shutter;
(iii) receiving the light passing through the first lens and the first shutter and generating an image;
(iv) moving the reflective member to a second position where the reflective member reflects light passing through the second lens and the second shutter toward the image pickup device;
(v) opening and closing the second shutter; and
(vi) receiving the light passing through the second lens and the second shutter and generating an image,
wherein a plurality of moving images are generated including a first moving image and a second moving image, the first moving image being generated by combining a series of images generated by the image pickup device when the image pickup device receives the light passing through the first lens and the first shutter and the second moving image being generated by combining a series of images generated by the image pickup device when the image pickup device receives the light passing through the second lens and the second shutter, and
wherein the method of controlling the portable game device sequentially implements steps (i) to (vi) and repeats a cycle including steps (i) to (vi).

* * * * *